(12) United States Patent
Yamamoto

(10) Patent No.: US 8,635,864 B2
(45) Date of Patent: Jan. 28, 2014

(54) EXHAUST GAS PURIFYING DEVICE

(75) Inventor: Hiroshi Yamamoto, Tochigi (JP)

(73) Assignee: Komatsu Ltd., Tokyo (JP)

( * ) Notice: Subject to any disclaimer, the term of this patent is extended or adjusted under 35 U.S.C. 154(b) by 324 days.

(21) Appl. No.: 13/058,164

(22) PCT Filed: Jul. 21, 2009

(86) PCT No.: PCT/JP2009/063024
§ 371 (c)(1),
(2), (4) Date: Feb. 8, 2011

(87) PCT Pub. No.: WO2010/016381
PCT Pub. Date: Feb. 11, 2010

(65) Prior Publication Data
US 2011/0138794 A1    Jun. 16, 2011

(30) Foreign Application Priority Data
Aug. 8, 2008   (JP) .................................. 2008-206130

(51) Int. Cl.
| | |
|---|---|
| *F01N 3/00* | (2006.01) |
| *F01N 3/10* | (2006.01) |
| *F01N 3/02* | (2006.01) |
| *F16L 11/12* | (2006.01) |
| *F16L 59/16* | (2006.01) |

(52) U.S. Cl.
USPC .................... 60/311; 60/299; 60/297; 285/48

(58) Field of Classification Search
USPC .................... 60/295, 297, 311, 322; 138/149; 285/47, 48
See application file for complete search history.

(56) References Cited

U.S. PATENT DOCUMENTS

| | | | |
|---|---|---|---|
| 5,250,269 A | 10/1993 | Langer | |
| 2005/0005773 A1 * | 1/2005 | Shutty et al. | ..................... 96/417 |
| 2006/0266022 A1 | 11/2006 | Woerner et al. | |
| 2006/0277900 A1 * | 12/2006 | Hovda et al. | .................... 60/299 |

FOREIGN PATENT DOCUMENTS

| | | | |
|---|---|---|---|
| EP | 1 728 984 A2 | 6/2006 | |
| FR | 2880065 A1 * | 6/2006 | ................ F01N 3/20 |
| JP | 7-30313 U | 6/1995 | |
| JP | 2002-511124 A | 4/2002 | |
| JP | 2003-172121 A | 6/2003 | |

(Continued)

OTHER PUBLICATIONS

International Search Report from International Application No. PCT/JP2009/063018, mailed Oct. 27, 2009, 2 pages.

(Continued)

*Primary Examiner* — Kenneth Bomberg
*Assistant Examiner* — Audrey K Bradley
(74) *Attorney, Agent, or Firm* — Fish & Richardson P.C.

(57) ABSTRACT

An exhaust gas purifying device includes a first case housing a soot filter for purifying exhaust gas, second and third cases that are respectively placed on an upstream side and a downstream side of the first case in an exhaust gas flowing direction, and a differential pressure sensor that detects pressure difference between the upstream side and the downstream side of the soot filter. Pipes are respectively attached to the first case and one of the second and third cases placed on the upstream side or the downstream side of the first case, the pipes introducing pressures inside the first case and the one of the second and third cases to the differential pressure sensor.

6 Claims, 5 Drawing Sheets

(56) References Cited

FOREIGN PATENT DOCUMENTS

| | | |
|---|---|---|
| JP | 2004-263593 A | 9/2004 |
| JP | 2005-120839 A | 5/2005 |
| JP | 2005-194949 A | 7/2005 |
| JP | 2005-282535 A | 10/2005 |
| JP | 2005-307828 A | 11/2005 |
| JP | 2006-524777 A | 11/2006 |
| JP | 2007-016706 A | 1/2007 |
| JP | 2007-023996 A | 2/2007 |
| WO | 98/50688 A1 | 11/1998 |
| WO | 2004/094794 A1 | 11/2004 |
| WO | 2004/096794 A1 | 11/2004 |
| WO | 2010/016380 A1 | 2/2010 |

OTHER PUBLICATIONS

International Search Report from International Application No. PCT/JP2009/063024, mailed Oct. 27, 2009, 1 page.

Office Action issued Nov. 11, 2011 in corresponding Swedish Application No. 1150171-5, 10 pages including English translation.

* cited by examiner

EXHAUST GAS PURIFYING DEVICE

CROSS REFERENCE TO RELATED APPLICATIONS

This application claims priority to Application No. PCT/JP2009/063024 filed on Jul. 21, 2009, which application claims priority to Application No. JP 2008-206130 filed on Aug. 8, 2008. The entire contents of both applications are incorporated herein by reference in their entireties. This application is also related to concurrently filed application Ser. No. 13/058,153, entitled "Exhaust Gas Purifying Device" by Hiroshi Yamamoto that claims priority to Application No. PCT/JP2009/063018 filed Jul. 21, 2009, which application claims priority to Application No. JP 2008-206129 filed on Aug. 8, 2008, having the same assignee as this application, both applications are hereby incorporated by reference in their entireties.

TECHNICAL FIELD

The present invention relates to an exhaust gas purifying device.

BACKGROUND ART

It has typically been known that an exhaust gas purifying device provided is in an exhaust pipe of an engine so that particulate matters (PM), i.e., particulate substances contained in exhaust gas that causes black exhaust, thereby preventing discharge of the PM into the atmosphere. The exhaust gas purifying device is generally provided with a soot filter for capturing PM and an oxidizing catalyst for oxidizing dosing fuel (e.g., diesel oil) to generate heat, the soot filter and the oxidizing catalyst each being covered by a cylindrical case (Patent Literature 1).

The cases are separable. When ash and the like accumulated on the soot filter are cleaned, the cases are disassembled and the case housing the soot filter is removed for maintenance.

CITATION LIST

Patent Literature

Patent Literature 1: JP-A-2004-263593

SUMMARY OF THE INVENTION

Problems to be Solved by the Invention

However, since the exhaust gas purifying device of Patent Literature 1 is provided with a plurality of separable cases, when the cases are disassembled for maintenance of the soot filter and re-assembled after the maintenance, the cases may be erroneously oriented.

An object of the invention is to provide an exhaust gas purifying device of which cases can be easily assembled without being erroneously oriented after the cases are disassembled.

Means for Solving the Problems

An exhaust gas purifying device according to an aspect of the invention includes: a first case housing a soot filter for purifying exhaust gas; a second case and a third case that are respectively placed on an upstream side and a downstream side of the first case in an exhaust gas flowing direction in a separable manner, the exhaust gas passing through the second case and the third case; and a detector that detects pressure difference between the upstream side and the downstream side of the soot filter, in which pipes are respectively attached to the first case housing the soot filter and one of the second and third cases that are placed on the upstream side or the downstream side of the first case, the pipes introducing pressures inside the first case and the one of the second and third cases to the detector.

According to the above aspect of the invention, since the pipes are respectively attached to the first case housing the soot filter and one of the second and third cases that is placed on the upstream side or the downstream side of the first case and connected to the detector, the combination of the respective pipes bridges over a joint portion of the cases. For instance, with the pipes having different dimensions, when the first case housing the soot filter is disassembled and is erroneously oriented for re-assembly, the dimensions of the pipes are too short or too long, thus leading to recognition and prevention of an erroneous connection.

In the exhaust gas purifying device according to the above aspect of the invention, the pipes are preferably made of metal.

With this arrangement, since the pipes are made of metal, the pipes lack flexibility. Accordingly, when the first case housing the soot filter is disassembled and is erroneously oriented for re-assembly, the pipes cannot be properly installed due to lack of flexibility. Thus, the first case needs to be connected only at a right orientation, thereby preventing an erroneous connection.

In the exhaust gas purifying device according to the above aspect of the invention, the detector is preferably located close to an inflow end or an outflow end of the first case housing the soot filter through which exhaust gas flows.

With this arrangement, since the detector is located close to the inflow end or the outflow end of the first case housing the soot filter through which exhaust gas flows, the dimensions of the metal pipes are different. Accordingly, when the first case housing the soot filter is disassembled and is erroneously oriented for re-assembly, the pipes cannot be properly installed. Thus, in order to properly install the pipes, the first case needs to be connected only at a right orientation, thereby preventing an erroneous connection.

In the exhaust gas purifying device according to the above aspect of the invention, it is preferable that one of the pipes is attached to the inflow end or the outflow end of the first case housing the soot filter close to one of the second and third cases while the other of the pipes is attached to the other of the second and third cases, and the detector is a differential pressure sensor.

With this arrangement, the pipes are respectively attached to the inflow end and the outflow end of the first case housing the soot filter, pressure difference between the inflow end and the outflow end of the first case is detected by the differential pressure sensor connected to the pipes, and a clogging degree of the soot filter can be judged.

In the exhaust gas purifying device according to the above aspect of the invention, the other of the second and third cases to which the other of the pipes is attached is connected to the downstream side of the first case housing the soot filter.

With this arrangement, since the case to which the other of the pipes is attached is connected to the downstream side of the first case housing the soot filter, the pipes can bridge over the joint portion on an outflow end of the soot filter.

DESCRIPTION OF EXEMPLARY EMBODIMENTS

Figure 1:
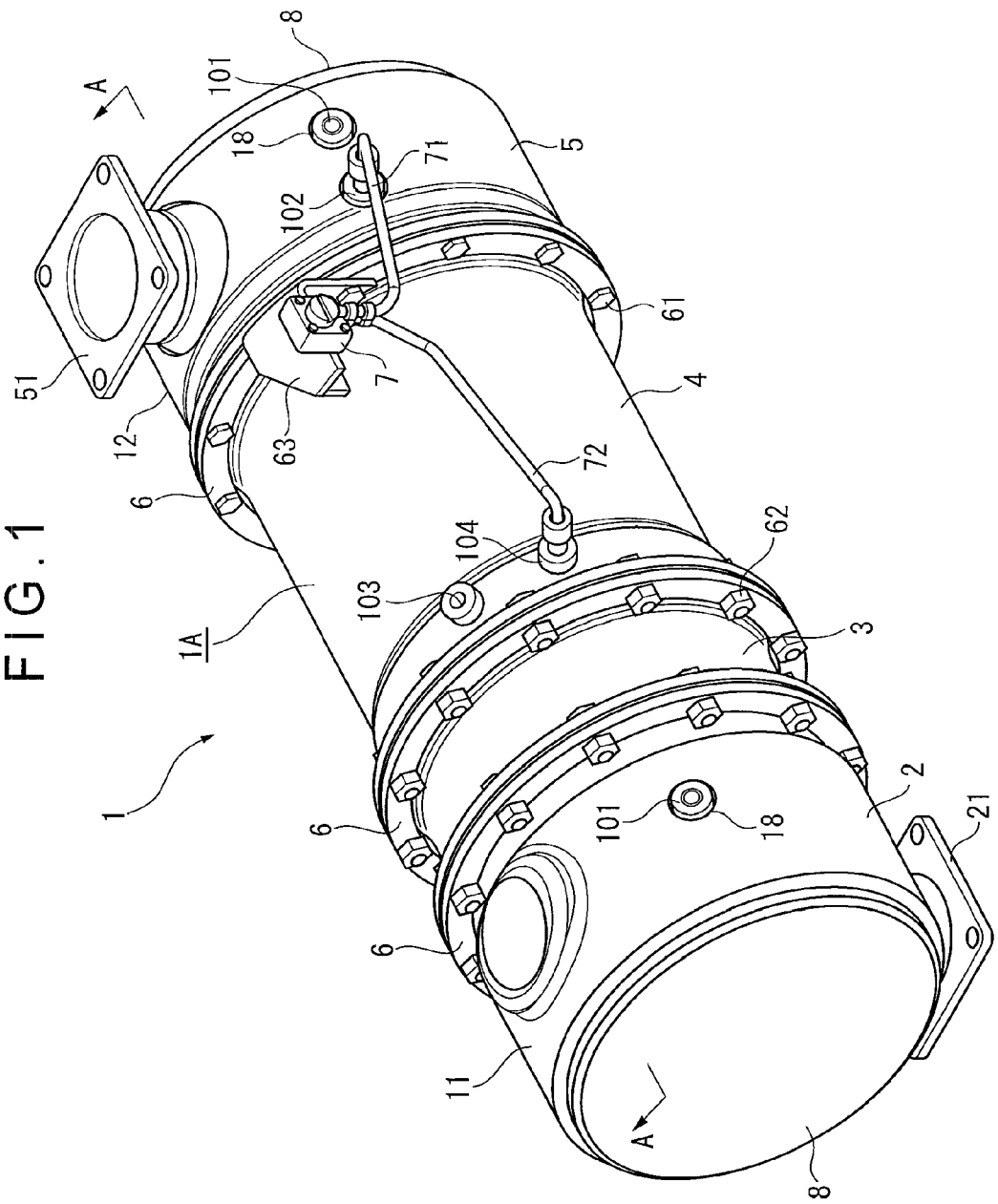
FIG. 1 is a perspective view showing an entire exhaust gas purifying device according to a first exemplary embodiment of the invention.

Embodiments of the invention will be described below with reference to the attached drawings. In a below-described second exemplary embodiment and subsequent exemplary embodiments, the same reference numerals are attached to components identical to or functionally similar to those in a below-described first exemplary embodiment so as to simplify or omit the explanation thereof.

First Exemplary Embodiment

A first embodiment of the present invention will be described below with reference to the attached drawings.

Hereinafter, an upstream side of an exhaust gas flow direction is referred to as an "upstream side" and a downstream side of the exhaust gas flow direction is a "downstream side" for convenience.

Figure 2:
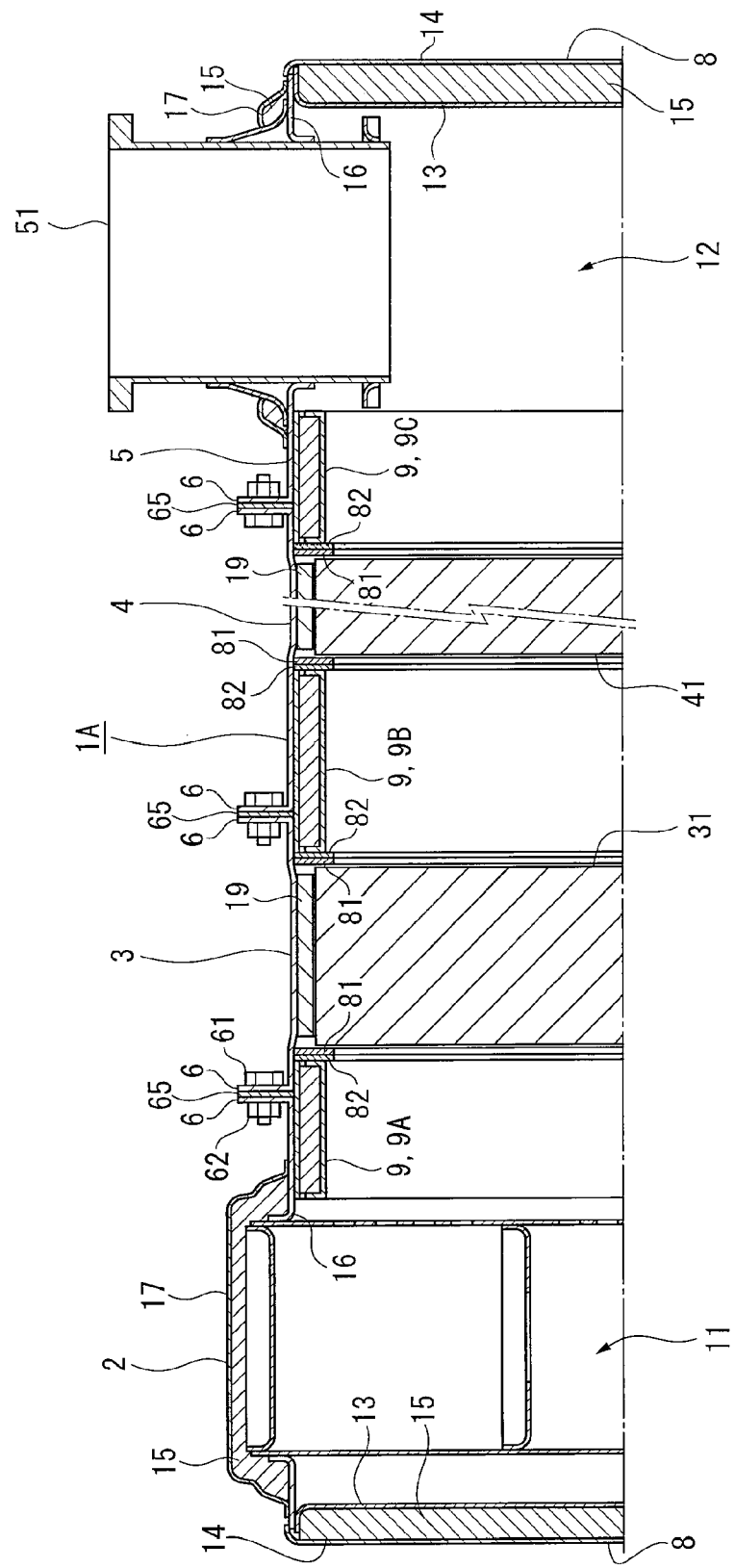
FIG. 2 is an illustration viewed in a direction of arrows A-A in FIG. 1.

FIG. 1 is a perspective view showing an entire exhaust gas purifying device 1 according to this exemplary embodiment. FIG. 2 is an illustration viewed in a direction of arrows A-A in FIG. 1. In FIGS. 1 and 2, the exhaust gas purifying device 1 is provided between exhaust pipes of a diesel engine (not shown) (hereinafter, simply referred to as an "engine") for capturing PM contained in exhaust gas and is provided with a case body 1A. The case body 1A includes: a cylindrical case 2 connected to the exhaust pipe of the engine; a cylindrical case 3 placed on the downstream side of the case 2; a cylindrical case 4 placed on the downstream side of the case 3; and a case 5 placed on the most downstream side and connected to an outlet pipe (not shown).

The cases 2 and 5 each includes a cylindrical outer periphery provided with a side wall 8. The inner spaces of the cases 2 and 5 respectively function as an inlet chamber 11 and an outlet chamber 12. The cases 2 and 5 are respectively provided with an inflow section 21 and an outflow section 51 through which exhaust gas flows in and out in a radial direction of the cases 2 and 5. The side wall 8 of each of the cases 2 and 5 has a double-wall structure having an inner wall plate 13 and an outer wall plate 14. A heat insulator 15 formed of glass fibers is interposed between the inner wall plate 13 and the outer wall plate 14. Similarly, a cylindrical portion of each of the cases 2 and 5 has a double-wall structure having an inner cylinder 16 and an outer cylinder 17. A heat insulator 15 is interposed also between the inner cylinder 16 and the outer cylinder 17. With this arrangement, even when exhaust gas passes through the inlet chamber 11 and the outlet chamber 12, heat from the exhaust gas is blocked by the heat insulator 15 to restrain heat transmission to outer surfaces of the cases 2 and 5. A flange joint 6 integrally formed with an exposed portion of the inner cylinder 16 is formed on an opening end of each of the cases 2 and 5.

In the cylindrical case 3, an oxidizing catalyst 31 is placed to oxidize dosing fuel to generate heat, and ringed stainless-steel wire meshes 81 and stoppers 82 are provided on both sides of the oxidizing catalyst 31. The stoppers 82 press the oxidizing catalyst 31 via the wire meshes 81 so as to prevent the protrusion of the oxidizing catalyst 31 from ends of the case 3.

Similarly, in the cylindrical case 4, a soot filter 41 for capturing PM in exhaust gas is housed, and the ringed stainless-steel wire meshes 81 and the stoppers 82 are provided on both sides of the soot filter 41.

The cases 3 and 4 each have a single-wall structure. Heat insulators 19 made of ceramic fibers are interposed between the oxidizing catalyst 31 housed in the case 3 and an inner surface of the case 3, and between the soot filter 41 and an inner surface of the case 4. With this arrangement, heat from exhaust gas passing through the oxidizing catalyst 31 and the soot filter 41 is restrained from being transferred to outer surfaces of the cases 3 and 4. Likewise, in each of the cases 3 and 4, the flange joints 6 are integrally formed on open ends of both sides.

Figure 3:
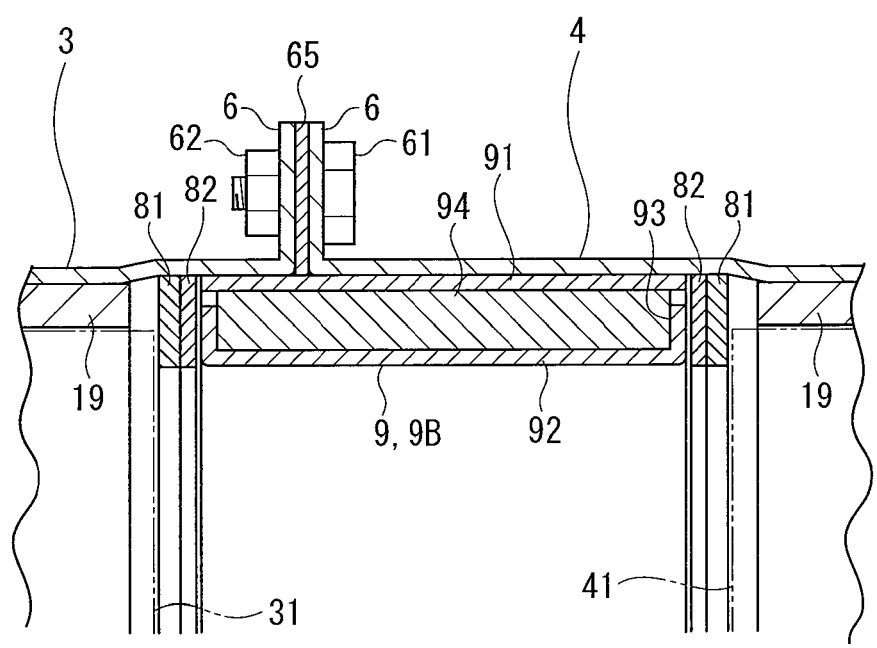
FIG. 3 is a cross sectional view showing a primary portion of the exhaust gas purifying device according to the first exemplary embodiment.

In the cases 2 to 5 described above, the flange joints 6 facing each other are brought into contact with each other through a sealing material 65 and connected to each other by a bolt 61 penetrating the flanges 6 and a nut 62 screwed onto the bolt 61. The sealing material 65, which is made of exfoliated graphite exhibiting high heat resistance, is placed so as to prevent exhaust gas passing through the exhaust gas purifying device 1 from leaking into to the atmosphere. When the cases 2 to 5 are coupled, heat insulating rings 9 are housed so as to respectively bridge between interiors of the cases 2 to 5 as shown in FIGS. 2 and 3. Specifically, a heat insulating ring 9A is placed between the cases 2 and 3 in a manner to protrude beyond the flange joint 6 of the case 2 so as to approach an inflow end of the oxidizing catalyst 31. A heat insulating ring 9B is placed between the cases 3 and 4 in a manner to protrude beyond the flange joint 6 of the case 4 so as to approach an outflow end of the oxidizing catalyst 31 and an inflow end of the soot filter 41. A heat insulating ring 9C is placed between the cases 4 and 5 in a manner to protrude beyond the flange joint 6 of the case 5 so as to approach an outflow end of the soot filter 41.

The heat insulating rings 9 (9A, 9B, 9C) each have the same overall structure except for different lengths in the exhaust gas flow direction. Specifically, as shown in an enlarged manner in FIG. 3 (in the figure, the heat-insulating ring 9B is shown as a representative example), the heat insulating rings 9 each include: a stainless-steel outer ring member 91 abutting on an inner surface of each of the cases 2 to 5; a stainless-steel inner ring member 92 formed to have a concave cross section and having a pair of outer flanges 93; and a heat insulator 94 made of ceramic fibers and interposed between the outer ring member 91 and the inner ring member 92. The heat insulator 94 is also formed in a cylindrical shape and has an inner diameter substantially equal to an outer diameter of a cylindrical portion of the inner ring member 92.

In each of the heat insulating rings 9, the inner ring member 92 is housed in the outer ring member 91 while the heat insulator 94 having a predetermined thickness is fitted on the outer periphery of the cylindrical portion of the inner ring member 92. As a result, the heat insulator 94 is pressed toward the outer ring member 91 by the inner ring member 92 to be interposed between the respective members 91 and 92 while being compressed. A reaction force at this time prevents positional shift of the inner ring member 92 relative to the outer ring member 91. The heat insulating rings 9 can be assembled in advance for easy handling. Moreover, interposing the heat insulator 94 between the outer flanges 93 prevents the heat insulator 94 from being shifted.

The heat insulating rings 9 are respectively housed in the cases 2 to 5 after the members 91, 92 and 94 are assembled. At this time, the outer ring member 91 is welded to an inner circumference of each of the cases 2 to 5. Welded parts will be described in detail below. In assembled heat insulating rings 9, the inner ring member 92 and the outer ring member 91 are not in contact with each other. Specifically, a thickness of the heat insulator 94 and a height of the outer flanges 93 of the inner ring member 92 are set such that the inner ring member 92 and the outer ring member 91 are not in contact with each other in view of an estimated compressed amount of the heat insulator 94. Accordingly, although the exhaust gas passing the heat insulating rings 9 is directly in contact with the inner ring member 92, heat at this time is restrained from transmitting from the inner ring member 92 to the outer ring member 91 and is favorably blocked by the heat insulator 94.

In each of the heat insulating rings 9, the heat insulating ring 9A radially overlaps with the heat insulator 15 of the case 2 on the upstream side and is adjacent to the heat insulator 19 of the case 3 through the wire mesh 81 and the stopper 82 on the downstream side. The heat insulating ring 9B is adjacent to the heat insulator 19 of the case 3 through the wire mesh 81 and the stopper 82 on the upstream side and is adjacent to the heat insulator 19 of the case 4 through the wire mesh 81 and the stopper 82 on the downstream side. The heat insulating ring 9C is adjacent to the heat insulator 19 of the case 4 through the wire mesh 81 and the stopper 82 on the upstream side and overlaps radially with the heat insulator 15 of the case 5 on the downstream side.

With this arrangement, the substantially-entire case body 1A of the exhaust purifying device 1 from the upstream side to the downstream side is substantially covered by the heat insulators 15, 19 and 94. Even the cases 3 and 4 having no double-wall structure can practically realize a double-wall structure excellent in heat insulating property by using the heat insulating rings 9. Consequently, the outer surfaces of all the cases 2 to 5 are prevented from being easily heated to a high temperature.

The heat insulating ring 9A among the heat insulating rings 9 has a larger engagement margin with the inner cylinder 16 of the case 2 than that with the case 3. The heat insulating ring 9A is housed in the inner cylinder 16 in advance. The heat insulating ring 9B has a larger engagement margin with the case 4 than that with the case 3. The heat insulating ring 9B is housed in the case 4 in advance. The heat insulating ring 9C has a larger engagement margin with the case 5 than that with the case 4. The heat insulating ring 9C is housed in the case 5 in advance. The outer ring members 91 of the heat insulating rings 9 are respectively welded to the cases 2 to 5 at the larger engagement margin between the heat insulating rings 9 and each of the cases 2 to 5. Specifically, the outer ring member 91 of the heat insulating ring 9A is welded to four weld holes (not shown) formed on the outer surface of the case 2. The outer ring member 91 of the heat insulating ring 9B is welded to weld holes of the case 4. The outer ring member 91 of the heat insulating ring 9C is welded to weld holes of the case 5.

Accordingly, in assembling the case body 1A by coupling the cases 2 to 5, a part of the heat insulating ring 9A protrudes from an opening of the case 2. An outer periphery of the protruding heat insulating ring 9A is fitted to an inflow end of the case 3. In other words, an outflow end of the case 2 and the inflow end of the case 3 are fit-coupled to each other while being guided by the heat insulating ring 9A.

Figure 4:
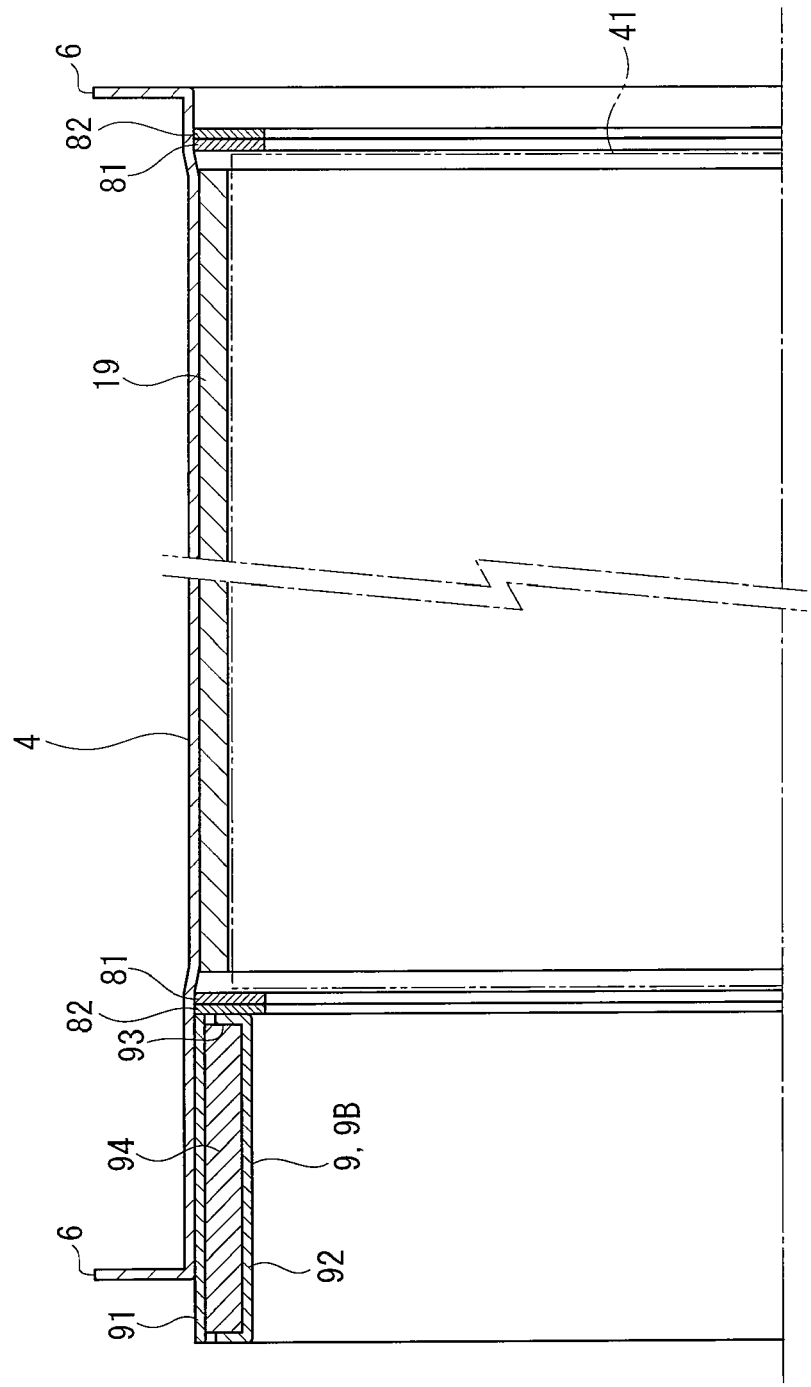
FIG. 4 is a cross sectional view showing a case of a part of the exhaust gas purifying device.

Similarly, as shown in FIG. 4, a part of the heat insulating ring 9B protrudes from an opening of an inflow end of the case 4. An outer periphery of the protruding heat insulating ring 9B is fitted to an outflow end of the case 3, thereby coupling the cases 3 and 4. In other words, the outflow end of the case 3 and the inflow end of the case 4 are also fit-coupled to each other while being guided by the heat insulating ring 9B.

Moreover, a part of the heat insulating ring 9C protrudes from an opening of an inflow end of the case 5. An outer periphery of the protruding heat insulating ring 9C is fitted to an outflow end of the case 4, thereby fit-coupling the cases 5 and 4 to each other.

Specifically, for the above fit-coupling, the heat-insulating rings 9A and 9C are set in advance respectively in the cases 2 and 5 (i.e., the both sides of the case body 1A) in such a manner as to protrude from the cases 2 and 5 to face each other. No heat insulating rings 9 is provided in the case 3 housing the oxidizing catalyst 31. In the case 4 housing the soot filter 41, the heat insulating ring 9B is provided in advance only on the upstream side in such a manner as to protrude from the case 4. Accordingly, when the cases 2 to 5 are arranged in a right order, the case 4 in which the soot filter 41 is housed is prevented from being connected at a reverse position (i.e., the inflow end and the outflow end of the soot filter 41 are reversed), so that an orientation of the case 4 for connection can be constantly fixed.

A sensor boss 101 is provided to each of the cases 2 and 5 of the case body 1 for attaching a temperature sensor (not shown) to measure temperature inside the inlet chamber 11 and the outlet chamber 12. The sensor boss 101 is attached to the inner cylinder 16. On the outer cylinder 17, an opening 18 is formed at a position corresponding to the sensor boss 101. The case 5 is similarly provided with a sensor boss 102 near the sensor boss 101. A rigid pipe 71 such as a steel pipe into which exhaust gas is flowed is attached to the sensor boss 102.

Thick disc sensor bosses 103 and 104 are provided on the outer surface near the exhaust gas inflow end of the case 4. The sensor boss 103 is attached with a temperature sensor (not shown) that measures an exhaust gas temperature at the inflow end of the soot filter 41. The sensor boss 104 is attached with a rigid pipe 72 such as a steel pipe into which exhaust gas flows from the inflow end of the soot filter 41. The pipe 72 and the above-mentioned pipe 71 are connected to a differential pressure sensor 7 serving as a detector. In this exemplary embodiment, the differential pressure sensor 7 is located close to the exhaust gas outflow end of the case 4 and is attached to the flange joint 6 near the outflow end of the case 4 by the bolt 61 and the nut 62 through a bracket 63.

The differential pressure sensor 7 detects a pressure difference between the inflow end and the outflow end of the soot filter 41. In the differential pressure sensor 7, a diaphragm provided with a strain gauge is placed. The diaphragm is displaced by the exhaust gas flowing into the pipes 71 and 72, and electrical resistance of the strain gauge is changed in response to the displacement of the diaphragm. The differential pressure can thus be detected based on the changed electrical resistance. Within the case 4, the soot filter 41 causes a pressure loss of exhaust gas: a pressure at the inflow end of the soot filter 41 (i.e., a pressure in the soot filter 41 close to the sensor boss 104) is larger than a pressure at the outflow end of the soot filter 41 (i.e., a pressure in the soot filter 41 close to the sensor boss 102). As PM begins to clog in the soot filter 41, the pressure loss, i.e., the differential pressure between the inflow end and the outflow end of the soot filter 41, becomes larger. A clogging degree of the soot filter 41 can be judged based on the differential pressure.

The connected differential sensor 7 and pipes 71 and 72 are placed in such a manner as to bridge over a joint portion between the cases 4 and 5. A dimension of the pipe 72 is larger than that of the pipe 71. Accordingly, in this exemplary embodiment with the different dimensions of the pipes 71 and 72, the orientation of the case 4 for connection, to which the pipe 72 is attached, is fixed relative to the case 5 to which the pipe 71 is attached.

In other words, when the case 4 is coupled to the case 5 in a manner such that the upstream and the downstream are reversed, the sensor bosses 102 and 104 become too close to each other, whereby the rigid pipes 71 and 72 cannot be connected to the sensor bosses 102 and 104 and the differential pressure sensor 7 cannot be attached to the case 4. In view of the above, similarly to the advantage of the above fit-coupling, the case 4 housing the soot filter 41 can be constantly coupled in the fixed orientation and prevented from being attached in a manner such that the upstream and the downstream are reversed.

In an engine room in which an engine is housed, the exhaust gas purifying device 1 of the invention may be attached to a frame and a hood constituting an engine room, or may be attached to an upper side of an engine and the like. An attachment position or the like may be appropriately determined at the time of attaching the exhaust purifying device 1.

According to this exemplary embodiment, at maintenance of the soot filter 41, the case body 1A is disassembled to remove the case 4 together with the soot filter 41. When the case body 1A is re-assembled after the maintenance, due to the different dimensions of the rigid pipes 71 and 72, the case 4 can be easily assembled without being erroneously oriented.

Second Exemplary Embodiment

Figure 5:
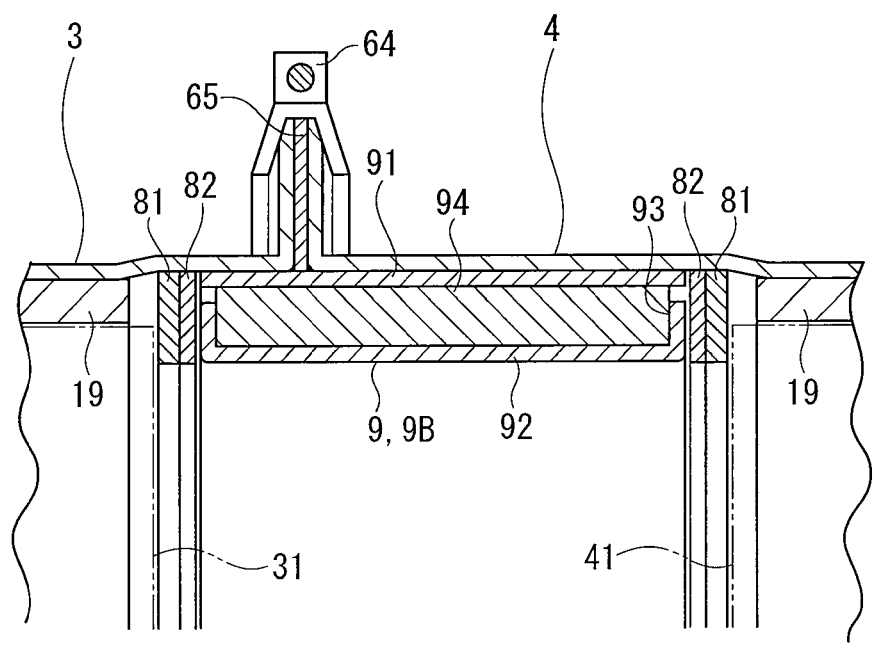
FIG. 5 is a cross sectional view showing a primary portion of an exhaust gas purifying device according to a second exemplary embodiment.

FIG. 5 is an illustration showing a second exemplary embodiment.

In the cases 2 to 5 according this exemplary embodiment, the sealing material 65 is interposed between the flange joints 6 and the flange joints 6 are connected by being fastened by a V-shaped clamp 64. With the above arrangement, the cases 2 to 5 can be favorably coupled in the same manner as in the above exemplary embodiments.

Although the best arrangement and method for implementing the invention has been disclosed above, the invention is not limited thereto. In other words, while the invention has been particularly explained and illustrated mainly in relation to a specific embodiment, a person skilled in the art could make various modifications in terms of shape, quantity or other particulars to the above described embodiment without deviating from the technical idea or an object of the invention.

Accordingly, any descriptions of shape or quantity or the like disclosed above are given as examples to enable easy understanding of the invention, and do not limit the invention, so that descriptions using names of components, with any such limitations of shape or quantity or the like removed in part or whole, are included in the invention.

In the above exemplary embodiments, the pipe 72 is placed on the inflow end of the case 4, the pipe 71 is placed on the inflow end of the case 5, and the differential pressure sensor 7 is attached to the flange joint 6 on the outflow end of the case 4, whereby the pipes 71 and 72 are located in such a manner as to bridge over the flange joint 6 on the outflow end of the case 4. However, for instance, the pipe 72 may be placed on the outflow end of the case 3, the pipe 71 may be placed on the outflow end of the case 4 and the differential pressure sensor 7 may be attached to the flange joint 6 on the inflow end of the case 4. Also with this arrangement, the pipes 71 and 72 are located across the flange joint 6 on the inflow end of the case 4, the differential pressure between the inflow end and the outflow end of the soot filter 41 can be detected and the case 4 can be prevented from being erroneously oriented.

Though the differential pressure sensor 7 is attached to the flange joints 6 in the above exemplary embodiments, the attachment position of the differential pressure sensor 7 is not limited thereto. The differential pressure sensor 7 may be attached at any position.

Though the cases 2 and 3 are separately formed in the above exemplary embodiments, the cases 2 and 3 may be integrally formed.

Though the exhaust gas purifying device 1 according to the above exemplary embodiments is provided with the oxidizing catalyst 31, the oxidizing catalyst 31 may be omitted depending on a different regeneration method of the soot filter 41.

Though the heat insulator 94 is made of ceramic fibers in the above respective exemplary embodiments, the heat insulator 94 may be made of glass fibers or any appropriate material.

The invention claimed is:
1. An exhaust gas purifying device, comprising:
a first case housing a soot filter for purifying exhaust gas;
a second case that houses an oxidizing catalyst and is fitted, in a separable manner, to an upstream side of the first case in an exhaust gas flowing direction;
a third case that is fitted, in a separable manner, to a downstream side of the first case in the exhaust gas flowing direction, and is configured to be connected at its downstream side to an outlet pipe in the exhaust gas flowing direction, the exhaust gas passing through the second case and the third case;
a fourth case that is provided with an inflow section into which the exhaust gas flows, the inflow section being configured to be connected to an exhaust pipe of an engine, wherein the second case is fitted, in a separable manner, to a downstream end of the fourth case in the exhaust gas flowing direction;
a heat insulating ring placed between the first case and at least one of the second and third cases; and
a detector that detects a pressure difference between an upstream side and a downstream side of the soot filter, wherein
pipes are respectively attached to the first case and the third case, the pipes introducing pressures inside the first case and the third case to the detector,
the pipes are made of metal,
one of the pipes is attached to the first case at a first attachment point that is closer to an inflow end than an outflow end of the first case, while the other of the pipes is attached to the third case at a second attachment point, and
the detector is a differential pressure sensor that is located closer to the outflow end than the inflow end of the first case and is attached to the first case.
2. The exhaust gas purifying device according to claim 1, wherein
the heat insulating ring is housed by the first case and at least one of the second and third cases, the heat insulating ring bridging between interiors of the first case and at least one of the second and third cases.
3. The exhaust gas purifying device according to claim 1, wherein the differential pressure sensor is positioned between the first and second attachment points.

4. The exhaust gas purifying device according to claim 1, wherein
the differential pressure sensor is attached to the first case via a bracket.

5. The exhaust gas purifying device according to claim 1, wherein
the third case is provided with an outflow section for the exhaust gas to flow in a radial direction.

6. The exhaust gas purifying device according to claim 1, wherein
the pipes attached to the first and third cases have different dimensions, one of the pipes being longer than the other.

* * * * *